United States Patent [19]

Setina

[11] Patent Number: 4,971,378
[45] Date of Patent: Nov. 20, 1990

[54] PIVOTED AUTOMOBILE PARTITION WITH ADJUSTABLE SPRING BIAS

[76] Inventor: John R. Setina, 2926 Yelm Hwy., SE., Olympia, Wash. 98501

[21] Appl. No.: 442,948

[22] Filed: Nov. 29, 1989

[51] Int. Cl.$^5$ ............................................. B62D 33/04
[52] U.S. Cl. ..................................... 296/24.1; 16/304; 16/76
[58] Field of Search ................. 296/24.1; 16/306, 304, 16/307, 76; 49/379, 386

[56] References Cited

U.S. PATENT DOCUMENTS

| | | | |
|---|---|---|---|
| 924,422 | 6/1909 | Bommer | 16/304 |
| 2,626,421 | 1/1953 | Lyons | 16/306 |
| 2,884,279 | 4/1959 | Halstead et al. | 296/24.1 |
| 3,510,164 | 5/1970 | Sestina | 296/24.1 |

Primary Examiner—Robert R. Song
Attorney, Agent, or Firm—Klarquist, Sparkman, Campbell, Leigh & Whinston

[57] ABSTRACT

A pivoted automobile partition is described including an adjustable spring bias means for adjusting the force of a coil spring which pivots the partition from a lowered position to a raised position. The adjustment means includes a threaded pivot shaft which is connected to one end of the coil spring and is adjusted into different rotational positions to change the tension of such spring. The pivot shaft is fixed in its adjusted position to a pivot arm on the partition by lock nuts. A tubular housing and plastic cover sleeve completely enclose the spring bias means so that it cannot be tampered with and cannot injure rear seat passengers.

16 Claims, 2 Drawing Sheets

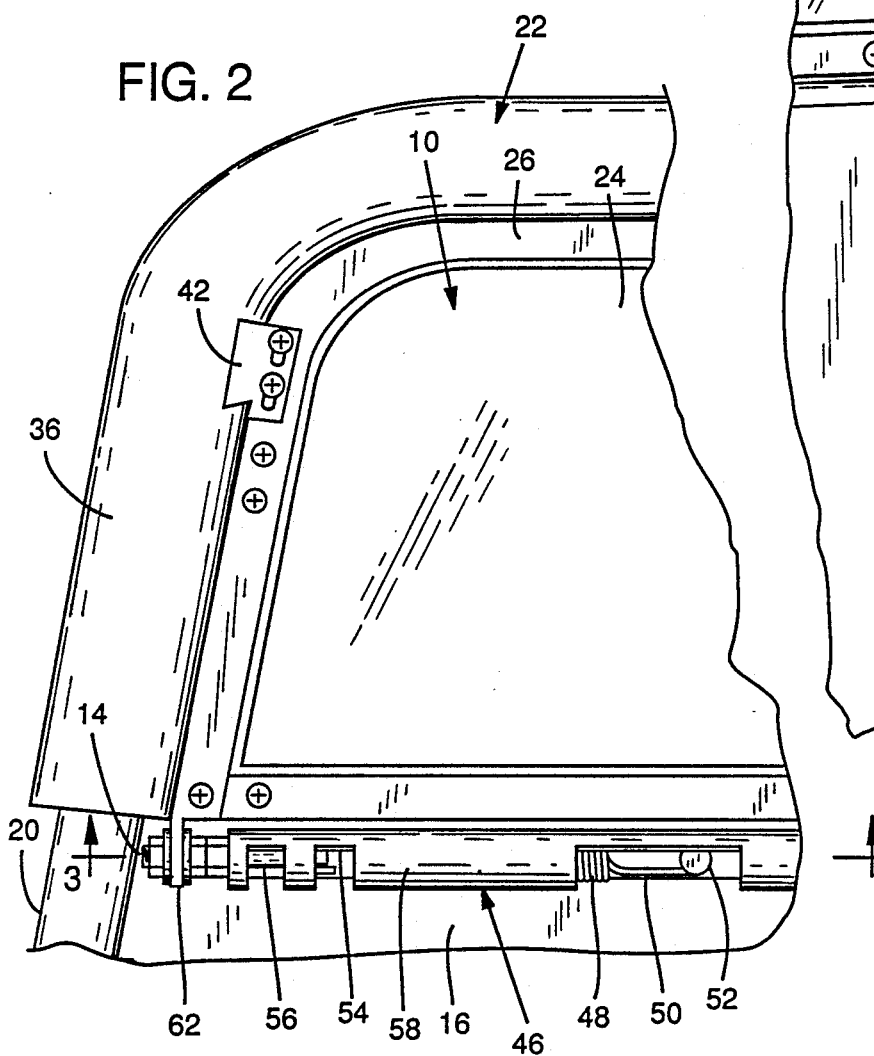
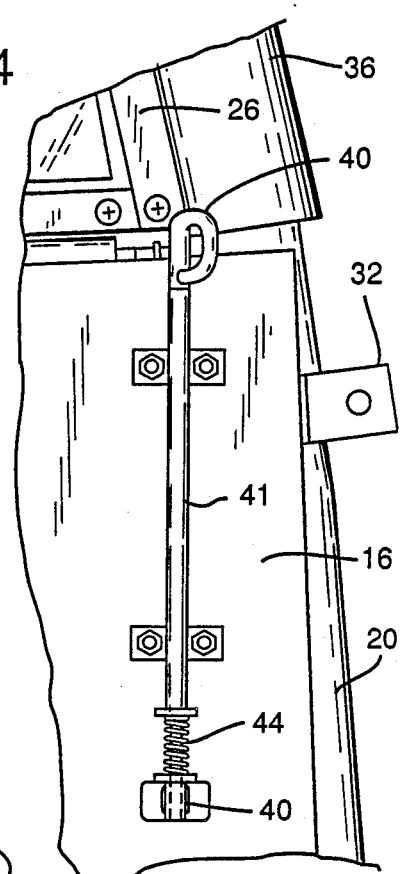
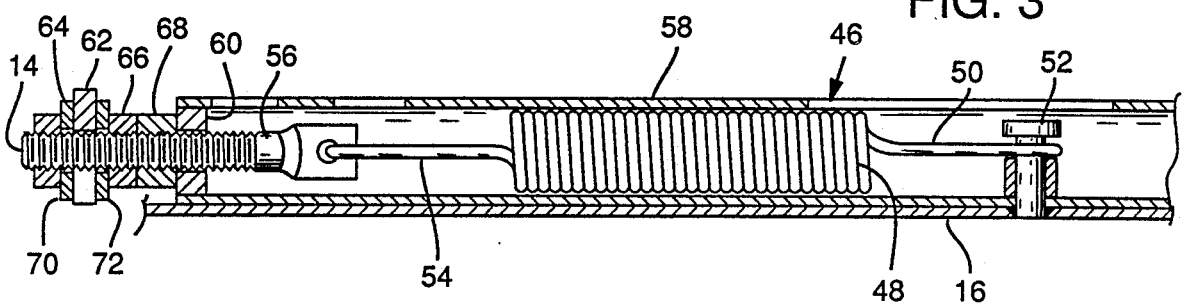

PIVOTED AUTOMOBILE PARTITION WITH ADJUSTABLE SPRING BIAS

BACKGROUND OF THE INVENTION

The present invention relates generally to vehicle partition apparatus and in particular to a pivoted automobile partition which is pivotally mounted in a position adjacent to the front seat backrest in order to fill the space between the top of such backrest and the roof of the automobile when the partition is in its raised position. The automobile partition apparatus is pivotally mounted to be automatically moved from a lowered position to raised position by bias spring means, including at least one coil spring which may be adjusted to change the bias force supplied by such spring means. Such an automobile partition apparatus is especially useful in police cars, taxicabs and other passenger vehicles to separate rear seat passengers from the driver and other front seat occupants.

It has been previously proposed in U.S. Pat. No. 3,510,164 of Setina, issued May 5, 1970, and a corresponding U.S. Reissue Pat. No. RE27,942 of Setina, issued Mar. 19, 1974, to provide an automobile partition which is pivoted on a guard plate attached between two roll bar legs adjacent to the top of the front seat backrest. However, spiral shaped leaf springs, sometimes referred to as clock springs, were employed as the bias springs for pivoting the partition from its lowered position to its raised position. Such clock spring bias means have the disadvantage that there is no way to adjust the pivoting force of such clock springs. Also, the clock springs are of relatively large diameter so that such springs are not concealed or enclosed to prevent tampering and injury to rear seat passengers. Thus, in the above mentioned patents, there was no adjustable bias spring means for pivoting the partition. As a result, when the spring aged through use, the pivoting force reduced until eventually it was too weak to raise the partition into the raised locked position, thereby necessitating replacement of the clock spring. To delay this spring replacement, the clock spring was sometimes initially set at such a strong force that the rapid pivoting of the partition upward into its raised position provided a substantial hazard to the rear seat passengers if they were struck by such pivoted partition. These problems have been overcome in the pivoted partition of the present invention by providing an adjustable spring bias means, including a coiled spring with multiple turn coils spaced longitudinally along the axis of the spring and a simple adjustment means for adjusting the bias of the spring before or after the partition is installed. This adjustment means operates merely by turning the pivot shaft to which one end of the spring is connected to the proper spring bias position and locking such shaft in the adjusted position by means of lock nuts. In addition, such coil spring is of relatively small diameter so that it is completely concealed within a tubular housing mounted on the back of the guard plate to which the partition is pivotally mounted. This prevents injury to the rear seat passenger and also prevents a passenger from tampering with the spring such as when such passenger is a prisoner seeking to escape from the automobile.

SUMMARY OF INVENTION

It is therefore one object of the present invention to provide an improved vehicle partition apparatus, including a pivoted partition with an adjustable spring bias means.

Another object of the invention is to provide such a partition apparatus in which the adjustable spring bias means can be quickly and easily adjusted in order to change the force of the spring for pivoting the petition from a lowered position to a raised position.

A further object of the invention is to provide an automobile partition apparatus, including a pivoted partition with an adjustable spring bias means, including compact coil springs and a simple adjustment means.

An additional object of the invention is to provide such a partition apparatus in which the adjustable spring bias means can be adjusted before and after the partition apparatus is installed in the vehicle.

Still another object of the invention is to provide an automobile partition apparatus with a pivoted partition for separating the rear seat passengers from the front seat occupants, which includes an adjustable spring bias means for adjusting the force which automatically pivots the partition from a lowered position to a raised locked position.

A still further object to the invention is to provide such an automobile partition apparatus in which the spring bias means includes a coil spring having multiple turn coils spaced longitudinally along the axis of the spring, which is completely enclosed in a spring housing to prevent tampering and to prevent injury to the rear seat passengers.

DESCRIPTION OF DRAWINGS

Other objects and advantages of the present invention will be apparent from the following detailed description of a preferred embodiment thereof and from the attached drawings of which:

FIG. 2 is an enlarged rear elevation view of a portion of the automobile partition apparatus of FIG. 1, shown in its raised position;

FIG. 3 is a vertical section view taken along line 3—3 of FIG. 2, showing the adjustable spring bias means for automatically pivoting the partition from a lowered position to a raised position;

FIG. 4 is an enlarged front elevation view of a portion of the automobile partition apparatus of the present invention showing the latch means for latching the partition in its lowered position;

DESCRIPTION OF PREFERRED EMBODIMENT

Figure 1:
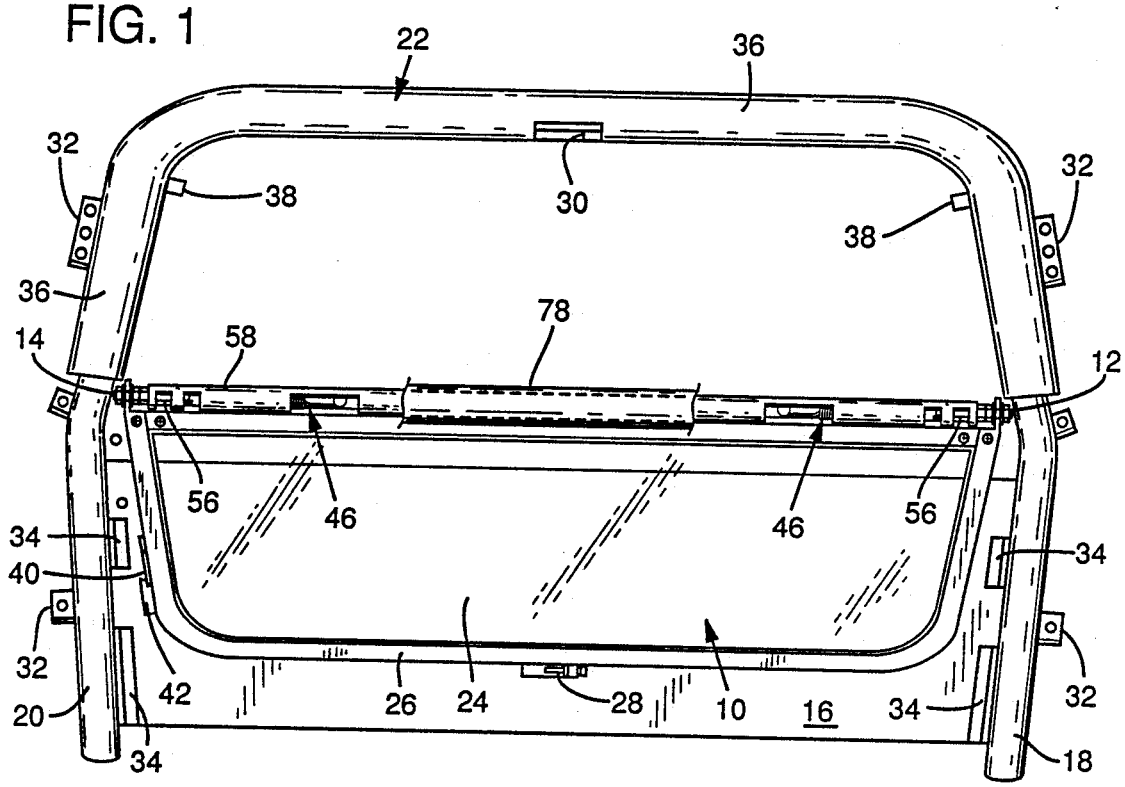
FIG. 1 is a rear elevation view showing the automobile partition apparatus of the present invention in a lowered position.

As shown in FIG. 1, an automobile partition apparatus in accordance with the present invention includes a pivoted partition 10 which is pivotally mounted at pivots 12 and 14 at the opposite ends thereof to the top of a metal guard plate 16 which is fixed between the two legs 18 and 20 of a roll bar. The roll bar has a top portion 22 which extends between the tops of legs 18 and 20 beneath and closely adjacent to the roof of the automobile to support such roof in the case of automobile rollover.

The partition 10 includes an unbreakable plastic window portion 24 mounted within a window frame 26 of aluminum or other metal which is provided with a latch 28 on such window frame for engagement with a mating catch 30 on the top portion 22 of the rollbar to lock the partition in its raised position. In its raised locked position the partition 10 fills the space between the top of the front seat backrest and the roof of the vehicle to separate the vehicle into a rear seat passenger compartment and a front seat compartment containing the driver of the vehicle.

As shown in FIG. 1, the rollbar is provided with a plurality of mounting flanges 32 welded thereto for mounting the rollbar to the frame of the automobile by bolts and the like. The metal guard plate 16 is secured to the legs of the rollbar 18 and 20 by welding at reinforcing flanges 34 and extends behind the front seat backrest from the floor to the top of such backrest to protect the driver from the rear seat passengers.

As shown in FIG. 1, a rollbar cover 36 of foam rubber is provided over the top portion 22 of the roll bar. When raised, the partition frame 26 engages two stop flanges 38, extending from the top of the rollbar to arrest further rotational movement of the partition window 10 and to allow the latch 28 to engage the catch 30, thereby locking the partition in a raised position. In addition, as shown in FIG. 4, a latch rod 40 is spring mounted within a tubular housing 41 secured to the front of the guard plate 16, adjacent to the driver's side of the automobile. The latch rod 40 engages a catch 42 fixed to the side of the partition frame, thereby locking the partition in the lowered position shown in FIG. 1. When latch rod 40 is pulled upwards, thereby compressing the latch spring 44, the catch 42 is released to allow the partition to be automatically pivoted into the raised position in a manner hereafter described.

Figure 5:
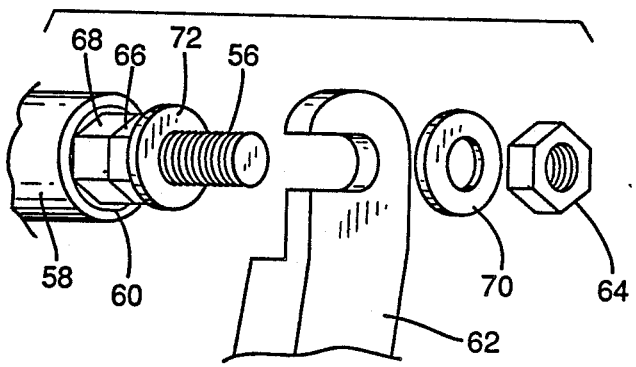
FIG. 5 is an enlarged exploded view of the pivot assembly at one end of the partition apparatus of FIG. 1.

As shown in FIGS. 1, 2 and 3, the pivoted partition apparatus of the present invention includes two adjustable spring bias means 46 at the opposite ends of the partition 10. The spring bias means each comprise a coil spring 48 having multiple coils spaced longitudinally along the axis of the spring to provide a bias spring of a relatively small outer diameter of about 1.0 inch. One end 50 of the bias spring 48 is fixed to the guard plate 16 by an attachment bolt or stud 52. The other end 54 of the bias spring is connected to a threaded pivot shaft 56 which is rotated to different bias positions to adjust the tension of the bias spring 48 in a manner hereafter described. The bias spring 48 extends within a tubular housing 58 such as a metal pipe which is attached to the guard plate 16 in any suitable manner, such as by welding. The pivot shaft 56 extends through an unthreaded bushing 60 in the end of the spring housing 58 and is secured to one of a pair of pivot arms 62 projecting from the bottom of the opposite ends of partition frame 26 and is clamped thereto by an end nut 64 threaded onto the end of the pivot shaft. A pair of lock nuts, 66 and 68, are threaded onto the pivot shaft 56 and tightened together in a locked position between the pivot arm 62 and the bushing 60 on the end of the spring housing 58. A pair of washers 70 and 72 may be provided on opposite sides of the pivot arm 62. The pivot shaft and pivot arm assembly is shown in the exploded view of FIG. 5 as well as in the assembled view of FIG. 3.

Operation of the spring bias adjustment means is accomplished by first loosening the end knot 64 and then rotating the lock nuts 66 and 62 together as a unit with wrench while maintaining them in locked configuration which results in rotation of the pivot shaft 56, thereby adjusting the tension of the bias spring 48 until the proper bias force for pivoting the partition is achieved. At this time, the end nut 64 is then again tightened to clamp the pivot arm 62 between such end nut and the lock nut 62 so that the pivot arm pivots together with the pivot shaft 56 in response to the force of the bias spring 48. When the latch 42, 40 is released, the partition 10 is automatically pivoted by the bias spring means 46 from the lower position of FIG. 1 to the raised position of FIG. 2.

Figure 6:
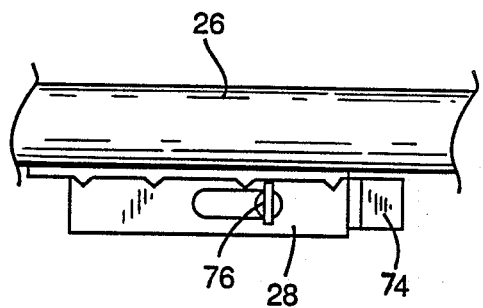
FIG. 6 is an enlarged view of the latch mechanism for the partition apparatus of FIG. 1.

As shown in FIG. 6, the latch assembly 28 includes a spring biased plunger 74 which engages a catch member in the catch assembly 30 attached to the roll bar top portion 22 to latch such partition in a raised position. The top latch 28 is unlocked by sliding a handle 76 connected to the plunger in a slot to the left to retract it against the spring which normally urges it outward. Then the partition is manually pivoted downward into its lowered position where the latch member 40 engages the catch 42 on the side of the partition frame.

The tubular spring housing 58 may be a metal pipe having an outer diameter of approximately 1¼ inches and may be covered by a plastic cover sleeve 78 shown in FIG. 1 with its opposite ends broken away for clarity, to cover the slots provided in the housing for access to the spring 48 and to completely enclose the adjustable spring bias means on the opposite ends of the partition so as to prevent tampering by rear seat passengers and to prevent injury to such passengers.

It will be apparent to one having ordinary skill in the art that changes may be made in the above-described preferred embodiment of the invention. Therefore, the scope of the invention should be determined by the following claims.

I claim:

1. Vehicle partition apparatus, comprising: a pivoted partition;
    mounting means for mounting said partition in a vehicle to separate a front compartment from a rear compartment in said vehicle;
    pivot means for pivotally attaching said partition to said mounting means;
    adjustable spring bias means for pivoting said partition from a lowered position to a raised position, said bias means including at least one coil spring with multiple coils spaced longitudinally along the bottom of the partition in its raised position; and
    adjustment means for adjusting the bias tension of said spring.

2. Partition apparatus in accordance with claim 1 in which the pivot means includes a shaft means attached to one end of the coil spring.

3. Partition apparatus in accordance with claim 2 in which the adjustment means adjusts the rotational position of the shaft means relative to a fixed end of the spring to adjust the bias tension of the spring.

4. Partition apparatus in accordance with claim 3 in which the adjustment means is provided by threaded stop means which engages a threaded portion of the shaft means.

5. Partition apparatus in accordance with claim 4 in which the stop means is provided by lock nuts.

6. Partition apparatus in accordance with claim 1 in which the spring is enclosed within a tubular housing which extends between a pair of spaced leg portions of a roll bar for the vehicle.

7. Partition apparatus in accordance with claim 6 in which a shield member is attached between the leg portions of the roll bar beneath the partition in its raised position and the tubular housing for the spring is attached to the top of said shield member.

8. Partition apparatus in accordance with claim 6 in which the spring means is enclosed in the tubular housing to reduce any chance of injury to passengers in the rear compartment.

9. Automobile partition apparatus, comprising:
a pivoted partition;
mounting means for mounting said partition in an automobile to separate a front compartment from a rear compartment in said automobile;
pivot means for pivotally attaching said partition to said mounting means;
adjustable spring bias means for pivoting said partition from a lowered position to a raised position, said bias means including at least one coil spring having multiple coils spaced longitudinally along the bottom of the partition in its raised position with one end fixed and its other end attached to said pivot means; and
adjustment means for adjusting the bias tension of said spring.

10. Partition apparatus in accordance with claim 9 in which the pivot means includes a shaft means attached to one end of the coil spring.

11. Partition apparatus in accordance with claim 10 in which the adjustment means adjusts the rotational position of the shaft means relative to the fixed end of the spring to adjust the bias tension of the spring.

12. Partition apparatus in accordance with claim 11 in which the adjustment means is provided by threaded stop means which engages a threaded portion of the shaft means.

13. Partition apparatus in accordance with claim 12 in which the stop means is provided by lock nuts.

14. Partition apparatus in accordance with claim 9 in which the spring is enclosed within a tubular housing which extends between a pair of spaced leg portions of a roll bar for the vehicle.

15. Partition apparatus in accordance with claim 14 in which a shield member is attached between the leg portions of the roll bar beneath the partition in its raised position and the tubular housing for the spring means is attached to the top of said shield member.

16. Partition apparatus in accordance with claim 14 in which the spring means is enclosed in the tubular housing to reduce any chance of injury to passengers in the rear compartment.

* * * * *